United States Patent
Inoue et al.

(10) Patent No.: US 9,884,225 B2
(45) Date of Patent: *Feb. 6, 2018

(54) GOLF BALL RESIN COMPOSITION AND GOLF BALL

(71) Applicant: DUNLOP SPORTS CO., LTD., Kobe-shi, Hyogo (JP)

(72) Inventors: Hidetaka Inoue, Kobe (JP); Toshiyuki Tarao, Kobe (JP); Mami Tanaka, Kobe (JP)

(73) Assignee: DUNLOP SPORTS CO. LTD., Kobe-Shi, Hyogo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 15/067,731

(22) Filed: Mar. 11, 2016

(65) Prior Publication Data

US 2016/0287944 A1    Oct. 6, 2016

(30) Foreign Application Priority Data

Mar. 31, 2015    (JP) .................................. 2015-071843

(51) Int. Cl.
*A63B 37/00*    (2006.01)
*C08L 77/02*    (2006.01)
*C08K 5/098*    (2006.01)

(52) U.S. Cl.
CPC ...... *A63B 37/0039* (2013.01); *A63B 37/0031* (2013.01); *A63B 37/0033* (2013.01); *A63B 37/0037* (2013.01); *A63B 37/0045* (2013.01); *A63B 37/0075* (2013.01); *A63B 37/0092* (2013.01); *C08K 5/098* (2013.01); *C08L 77/02* (2013.01); *A63B 37/0024* (2013.01); *A63B 37/0043* (2013.01); *A63B 37/0049* (2013.01); *A63B 37/0051* (2013.01); *A63B 37/0062* (2013.01); *A63B 37/0069* (2013.01); *C08L 2205/025* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 2003/0064828 A1 | 4/2003 | Kato | |
| 2010/0009776 A1* | 1/2010 | Okabe | A63B 37/0003 473/373 |
| 2010/0087275 A1* | 4/2010 | Isogawa | A63B 37/0003 473/374 |
| 2010/0167842 A1 | 7/2010 | Okabe | |
| 2011/0237348 A1* | 9/2011 | Okabe | A63B 37/0003 473/373 |
| 2016/0287943 A1* | 10/2016 | Inoue | A63B 37/0039 |

FOREIGN PATENT DOCUMENTS

| | | |
|---|---|---|
| JP | 2003-10359 A | 1/2003 |
| JP | 2010-154970 A | 7/2010 |

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a material for obtaining a golf ball having excellent shot feeling and flight distance. The present invention provides a golf ball resin composition having a ratio (flexural elastic modulus/slab hardness) of a flexural elastic modulus (MPa) to a slab hardness (Shore D hardness) in a range from 3 to 5, and containing, as a resin component, (A) a polyamide resin, (B) at least one selected from the group consisting of (b-1) a binary copolymer, (b-2) a metal ion-neutralized product of a binary copolymer, (b-3) a ternary copolymer and (b-4) a metal ion-neutralized product of a ternary copolymer, and (C) a thermoplastic elastomer.

26 Claims, 2 Drawing Sheets ical layer or a cover layer is formed from a highly rigid material, the flight distance of the golf ball is increased, however, the shot feeling of the golf ball tends to become worse. In this case, in order to improve the shot feeling of the golf ball, a soft layer formed from a soft material can be considered to be disposed inside a layer formed from a highly rigid material. However, in case of merely using a soft material, the flight distance of the golf ball is lowered. The present invention has been achieved in view of the above circumstances, and an object of the present invention is to provide a golf ball showing a great
GOLF BALL RESIN COMPOSITION AND GOLF BALL

FIELD OF THE INVENTION

The present invention relates to a golf ball resin composition and a golf ball using the golf ball resin composition.

DESCRIPTION OF THE RELATED ART

Examples of a method for increasing the flight distance of a golf ball include a method of imparting an outer-hard and inner soft hardness distribution to a golf ball. If a golf ball has an outer-hard and inner soft hardness distribution, the spin rate on driver shots or long iron shots is lowered, and thus the flight distance thereof is improved. Further, examples of the method of imparting an outer-hard and inner soft hardness distribution to a golf ball include a method of forming an intermediate layer or a cover layer from a highly rigid material. As such the highly rigid material, various resin compositions having an ionomer resin as a base material have been proposed.

For example, Japanese Patent Publication No. 2010-154970 A proposes forming an intermediate layer from a high fluidity intermediate layer composition, wherein the high fluidity intermediate layer composition contains, as a resin component, (A) a polyamide resin composition having a flexural elastic modulus in a range from 500 MPa to 4,000 MPa and a melt flow rate (240° C., 2.16 kgf) of 5.0 g/10 min or more, and containing (a-1) a polyamide resin and (a-2) a resin having at least one functional group selected from the group consisting of a hydroxyl group, a carboxyl group, an anhydride group, a sulfonic acid group and an epoxy group (including a glycidyl group); and (B) at least one selected from the group consisting of an ethylene-(meth)acrylic acid binary copolymer, a metal-neutralized product of an ethylene-(meth)acrylic acid binary copolymer, an ethylene-(meth)acrylic acid-(meth)acrylic acid ester ternary copolymer, and a metal-neutralized product of an ethylene-(meth)acrylic acid-(meth)acrylic acid ester ternary copolymer (refer to paragraph 0008 in Japanese Patent Publication No. 2010-154970 A).

In addition, Japanese Patent Publication No. 2003-010359 A proposes forming a cover from a cover composition, wherein the cover composition contains, as a primary component, a heat mixture of (a) an ionomer resin and (b) a thermoplastic elastomer selected from the group consisting of a styrene-based thermoplastic elastomer, a polyolefin-based thermoplastic elastomer, a polyurethane-based thermoplastic elastomer, a polyester-based thermoplastic elastomer, a polyamide-based thermoplastic elastomer or a mixture of at least one thereof (refer to paragraph 0030 in Japanese Patent Publication No. 2003-010359 A).

SUMMARY OF THE INVENTION

If the intermediate layer or cover layer is formed from a highly rigid material, the flight distance of the golf ball is increased, however, the shot feeling of the golf ball tends to become worse. In this case, in order to improve the shot feeling of the golf ball, a soft layer formed from a soft material can be considered to be disposed inside a layer formed from a highly rigid material. However, in case of merely using a soft material, the flight distance of the golf ball is lowered. The present invention has been achieved in view of the above circumstances, and an object of the present invention is to provide a golf ball showing a great flight distance on long iron shots and an excellent shot feeling. In addition, another object of the present invention is to provide a golf ball resin composition appropriately used for the above golf ball.

The golf ball resin composition of the present invention that has solved the above problems has a ratio (flexural elastic modulus/slab hardness) of a flexural elastic modulus (MPa) thereof to a slab hardness (Shore D hardness) thereof in a range from 3 to 5, and contains, as a resin component, (A) a polyamide resin, (B) at least one selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, and (C) a thermoplastic elastomer different from the (A) component and the (B) component.

The golf ball of the present invention comprises a core, at least one intermediate layer covering the core, and a cover covering the intermediate layer, wherein at least one member of the core, at least one intermediate layer and the cover is formed from the above golf ball resin composition.

A golf ball having excellent shot feeling and flight distance can be easily obtained by using the golf ball resin composition of the present invention.

DESCRIPTION OF THE PREFERRED EMBODIMENT

Figure 1:
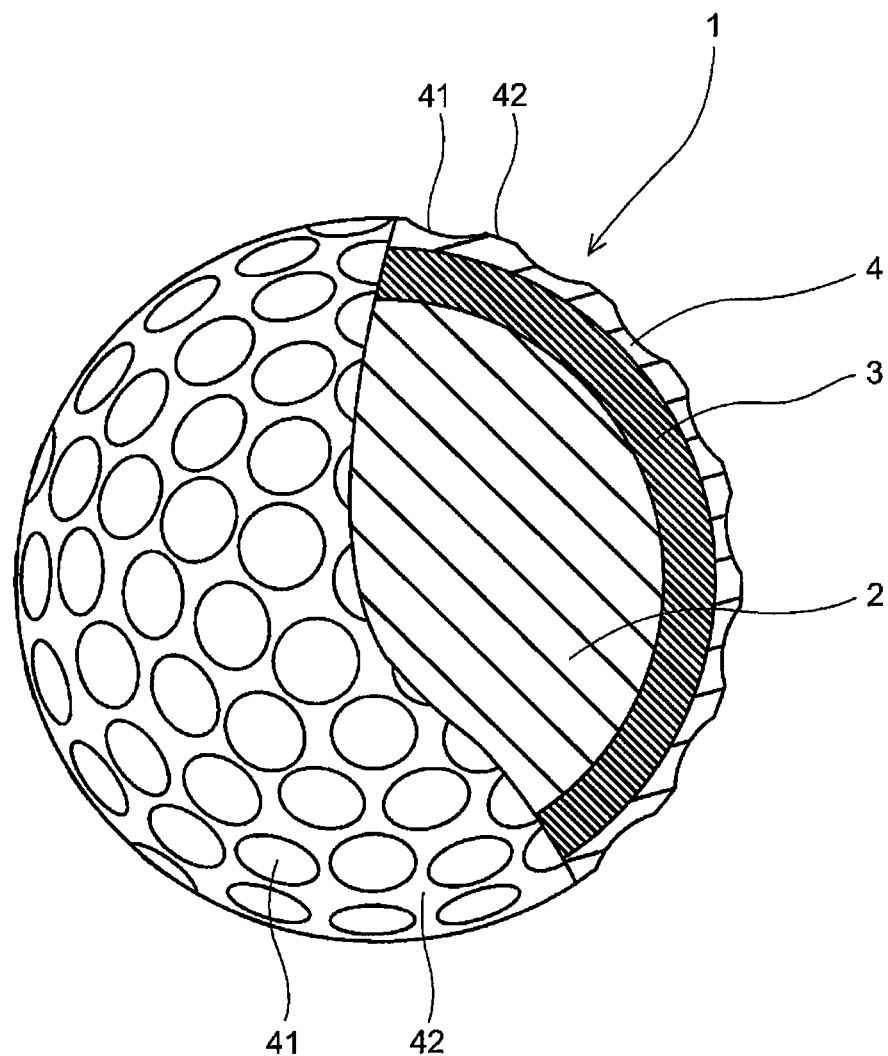
FIG. 1 is a partially cutaway sectional view showing a golf ball of one embodiment according to the present invention.
Figure 2:
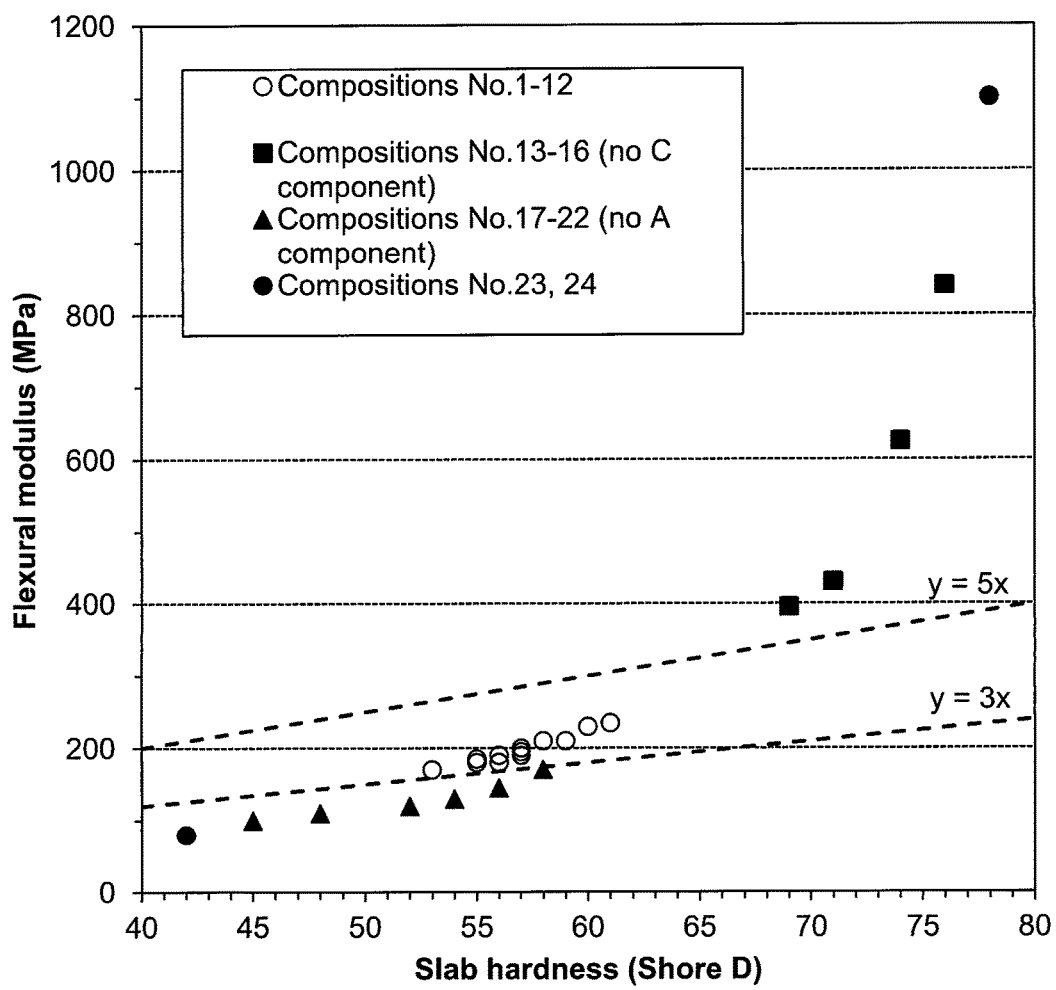
FIG. 2 shows a relationship between a flexural elastic modulus and a slab hardness of a golf ball resin composition.

The golf ball resin composition of the present invention has a ratio (flexural elastic modulus/slab hardness) of a flexural elastic modulus (MPa) thereof to a slab hardness (Shore D hardness) thereof in a range from 3 to 5, and contains, as a resin component, (A) a polyamide resin, (B) at least one selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, and (C) a thermoplastic elastomer different from the (A) component and the (B) component.

If the (A) component, the (B) component and the (C) component are contained as the resin component, the flexural elastic modulus of the golf ball resin composition can be increased without excessively increasing the hardness of the golf ball resin composition. In addition, if the ratio (flexural elastic modulus/slab hardness) falls within the above range, a member formed from the resin composition is relatively soft but has high elastic modulus. Therefore, a golf ball having excellent shot feeling and flight distance can be easily obtained by using the above golf ball resin composition.

The materials that can be used in the golf ball resin composition will be explained.

[(A) Component]

The polyamide resin used as the (A) component is not particularly limited, as long as it is a polymer having a plurality of amide bonds (—NH—CO—) in the main molecular chain thereof. Examples of the polyamide resin include a product having amide bonds within the molecule thereof, formed by a ring-opening polymerization of lactams, a condensation reaction of amino acids, or a condensation reaction between a diamine component and a dicarboxylic acid component.

Examples of the lactam include ε-caprolactam, undecanelactam, lauryllactam and the like. Examples of the amino acid include 6-aminocaproic acid, 11-aminoundecanoic acid, 12-aminododecanoic acid, para-aminomethyl benzoic acid and the like.

Examples of the diamine component include an aliphatic diamine, an aromatic diamine and an alicyclic diamine. Examples of the aliphatic diamine include tetramethylene diamine, hexamethylene diamine, 2-methylpentamethylene diamine, undecamethylene diamine, dodecamethylene diamine, 2,2,4-trimethylhexamethylene diamine, 2,4,4-trimethylhexamethylene diamine, and 5-methylnonamethylene diamine. Examples of the aromatic diamine include meta-xylylene diamine and para-xylylene diamine. Examples of the alicyclic diamine include 1,3-bis(aminomethyl) cyclohexane, 1,4-bis(aminomethyl) cyclohexane, 1-amino-3-aminomethyl-3,5,5-trimethylcyclohexane, bis(4-aminocyclohexyl) methane, bis(3-methyl-4-aminocyclohexyl) methane, 2,2-bis(4-aminocyclohexyl) propane, bis(aminopropyl) piperazine, and aminoethyl piperazine.

Examples of the dicarboxylic acid component include an aliphatic dicarboxylic acid, an aromatic dicarboxylic acid, and an alicyclic dicarboxylic acid. Examples of the aliphatic dicarboxylic acid include adipic acid, suberic acid, azelaic acid, sebacic acid, and dodecane dicarboxylic acid. Examples of the aromatic dicarboxylic acid include terephthalic acid, isophthalic acid, 2-chloroterephthalic acid, 2-methylterephthalic acid, 5-methylisophthalic acid, 5-sodiumsulfoisophthalic acid, hexahydroterephthalic acid, and hexahydroisophthalic acid. Examples of the alicyclic dicarboxylic acid include 1,4-cyclohexanedicarboxylic acid.

Examples of the (A) polyamide resin include an aliphatic polyamide, a semi-aromatic polyamide, and an aromatic polyamide. Examples of the aliphatic polyamide include polyamide 6, polyamide 11, polyamide 12, polyamide 66, polyamide 610, and polyamide 612. Examples of the semi-aromatic polyamide include polyamide 6T, polyamide 6I, polyamide 9T, and polyamide M5T. Examples of the aromatic polyamide include poly-p-phenyleneterephthalamide, and poly-m-phenyleneisophthalamide. These polyamide resins may be used solely or as a mixture of at least two of them. Among them, in light of processibilty and durability, the aliphatic polyamide is preferred, and polyamide 6, polyamide 66, polyamide 11 and polyamide 12 are particularly preferred.

Examples of the (A) polyamide resin include "Rilsan (registered trademark) B (e.g. BESN TL, BESN P20 TL, BESN P40 TL, MB3610, BMF O, BMN O, BMN O TLD, BMN BK TLD, BMN P20 D, and BMN P40 D)" commercially available from Arkema Inc., "Novamid (registered trademark) (e.g. 1010C2, 1011CH5, 1013C5, 1010N2, 1010N2-2, 1010N2-1ES, 1013G (H) 10-1, 1013G (H) 15-1, 1013G (H) 20-1, 1013G (H) 30-1, 1013 (H) 45-1, 1015G33, 1015GH35, 1015GSTH, 1010GN2-30, 1015F2, ST220, ST145, 3010SR, 3010N5-SL4, 3021G (H) 30, and 3010GN30)" commercially available from DSM Engineering Plastics Corporation, and "Amilan (registered trademark) (e.g. CM1007, CM1017, CM1017XL3, CM1017K, CM1026, CM3007, CM3001-N, CM3006, and CM3301 L)" commercially available from Toray Industries Inc.

The flexural elastic modulus (ISO178) of the (A) polyamide resin is preferably 500 MPa or more, more preferably 520 MPa or more, even more preferably 550 MPa or more, and particularly preferably 2,500 MPa or more, and is preferably 4,000 MPa or less, more preferably 3,500 MPa or less, and even more preferably 3,200 MPa or less. If the flexural elastic modulus of the polyamide resin is 500 MPa or more, the obtained golf ball constituent member has high elasticity. In addition, if the flexural elastic modulus of the (A) polyamide resin is 4,000 MPa or less, the obtained golf ball constituent member does not become excessively hard and thus the shot feeling of the golf ball becomes better.

The slab hardness of the (A) polyamide resin is preferably 55 or more, more preferably 60 or more, and even more preferably 65 or more, and is preferably 90 or less, more preferably 87 or less, and even more preferably 85 or less in Shore D hardness. If the slab hardness is 55 or more, the hardness of the layer formed from the resin composition is increased and thus the effect of low spin rate on driver shots of the golf ball is enhanced, and if the slab hardness is 90 or less, the layer formed from the resin composition does not become excessively hard and thus the shot feeling of the golf ball becomes better.

The melt flow rate (hereinafter, sometimes referred to as "MFR") (ISO113) (260° C., 325 gf) of the (A) polyamide resin is preferably 5 g/min or more, more preferably 8 g/min or more, and even more preferably 20 g/min or more, and is preferably 170 g/min or less, more preferably 150 g/10 min or less, and even more preferably 120 g/10 min or less. If the MFR (260° C., 325 gf) of the polyamide resin is 5 g/10 min or more, the fluidity becomes better and thus molding the golf ball constituent member becomes easy. In addition, if the MFR (260° C., 325 gf) of the polyamide resin is 170 g/10 min or less, the obtained golf ball has better durability.

The degree of polymerization of the polyamide resin is not particularly limited. The relative viscosity of the polyamide resin, measured by a method in accordance with ISO307, is preferably in a range from 1.5 to 5.0, and more preferably in a range from 2.0 to 4.0.

As the polyamide resin, for example, a polyamide resin having crystalline state and amorphous state in a coexisting manner is preferable. In this case, the degree of crystallinity of the polyamide resin is preferably 5% or more, more preferably 6% or more, and even more preferably 6.5% or more, and is preferably 15% or less, more preferably 14% or less, and even more preferably 13% or less. The degree of crystallinity X can be calculated according to the following formula.

$$X=\{dc(d-da)\}/\{d(dc-da)\}$$

Herein, dc: density of crystalline state, da: density of amorphous state, d: density of sample.

The content of the (A) component in the resin component of the golf ball resin composition is preferably 10 mass % or more, more preferably 13 mass % or more, and even more preferably 15 mass % or more, and is preferably 60 mass % or less, more preferably 55 mass % or less, and even more preferably 50 mass % or less. If the content of the (A) component is 10 mass % or more, the effect of high rigidity due to the (A) component is enhanced, and if the content of the (A) component is 60 mass % or less, the rigidity of the resin composition does not become excessively high and thus the resultant layer has better durability.

[(B) Component]

The (B) component contains at least one selected from the group consisting of (b-1) a binary copolymer composed of an olefin and an α,β-unsaturated carboxylic acid having 3 to 8 carbon atoms (hereinafter, sometimes referred to as "(b-1) binary copolymer"), (b-2) a metal ion-neutralized product of a binary copolymer composed of an olefin and an α,β-unsaturated carboxylic acid having 3 to 8 carbon atoms (hereinafter, sometimes referred to as "(b-2) binary ionomer resin"), (b-3) a ternary copolymer composed of an olefin, an α,β-unsaturated carboxylic acid having 3 to 8 carbon atoms and an α,β-unsaturated carboxylic acid ester (hereinafter, sometimes referred to as "(b-3) ternary copolymer"), and (b-4) a metal ion-neutralized product of a ternary copolymer composed of an olefin, an α,β-unsaturated carboxylic acid having 3 to 8 carbon atoms and an α,β-unsaturated carboxylic acid ester (hereinafter, sometimes referred to as "(b-4) ternary ionomer resin"). Further, the (b-1) binary copolymer, the (b-2) binary ionomer resin, the (b-3) ternary copolymer and the (b-4) ternary ionomer resin may be used solely or as a mixture of at least two of them.

The (b-1) component and the (b-3) component are non-ionic copolymers in which carboxyl groups are not neutralized.

The content of the α,β-unsaturated carboxylic acid component having 3 to 8 carbon atoms in the (b-1) binary copolymer or the (b-3) ternary copolymer is preferably 4 mass % or more, more preferably 5 mass % or more, and is preferably 30 mass % or less, more preferably 25 mass % or less.

The MFR (190° C., 2.16 kgf) of the (b-1) binary copolymer or the (b-3) ternary copolymer is preferably 5 g/10 min or more, more preferably 10 g/10 min or more, and even more preferably 15 g/10 min or more, and is preferably 1,700 g/10 min or less, more preferably 1,500 g/10 min or less, and even more preferably 1,300 g/10 min or less. If the MFR (190° C., 2.16 kgf) of the (b-1) binary copolymer or the (b-3) ternary copolymer is 5 g/10 min or more, the fluidity of the golf ball resin composition becomes better and thus a thin constituent member is easily formed. In addition, if the MFR (190° C., 2.16 kgf) of the (b-1) binary copolymer or the (b-3) ternary copolymer is 1,700 g/10 min or less, the obtained golf ball has better durability.

The (b-2) component and the (b-4) component are ionomer resins in which at least a part of carboxyl groups of the copolymer is neutralized with a metal ion.

As the (b-2) binary ionomer resin and the (b-4) ternary ionomer resin, an ionomer resin which has been neutralized beforehand may be used, or a mixture of a binary copolymer composed of an olefin and an α,β-unsaturated carboxylic acid having 3 to 8 carbon atoms and/or a ternary copolymer composed of an olefin, an α,β-unsaturated carboxylic acid having 3 to 8 carbon atoms and an α,β-unsaturated carboxylic acid ester with a metal compound may be used. Examples of the metal compound for neutralizing the carboxyl groups of the binary copolymer and/or the ternary copolymer include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate.

The content of the α,β-unsaturated carboxylic acid component having 3 to 8 carbon atoms in the (b-2) binary ionomer resin or the (b-4) ternary ionomer resin is preferably 2 mass % or more, more preferably 3 mass % or more, and is preferably 30 mass % or less, more preferably 25 mass % or less.

Examples of the metal ion for neutralizing at least a part of the carboxyl groups of the (b-2) component and the (b-4) component include a monovalent metal ion such as sodium, potassium, lithium and the like; a divalent metal ion such as magnesium, calcium, zinc, barium, cadmium and the like; a trivalent metal ion such as aluminum and the like; and other ion such as tin, zirconium and the like.

The degree of neutralization of the (b-2) binary ionomer resin is preferably 15 mole % or more, more preferably 20 mole % or more, and is preferably 90 mole % or less, more preferably 85 mole % or less. If the degree of neutralization is 15 mole % or more, the obtained golf ball has better resilience and durability. On the other hand, if the degree of neutralization is 90 mole % or less, the golf ball resin composition has better fluidity (good moldability).

The degree of neutralization of the (b-4) ternary ionomer resin is preferably 20 mole % or more, more preferably 30 mole % or more, and is preferably 90 mole % or less, more preferably 85 mole % or less. If the degree of neutralization is 20 mole % or more, the golf ball obtained by using the golf ball resin composition has better resilience and durability, and if the degree of neutralization is 90 mole % or less, the golf ball resin composition has better fluidity (good moldability).

It is noted that the degree of neutralization of the ionomer resin can be calculated by the following expression.

Degree of neutralization of ionomer resin (mole %)=100×(number of moles of neutralized carboxyl groups in ionomer resin/number of moles of all carboxyl groups in ionomer resin)

The flexural elastic modulus of the (b-2) binary ionomer resin is preferably 140 MPa or more, more preferably 150 MPa or more, even more preferably 160 MPa or more, and particularly preferably 200 MPa or more, and is preferably 550 MPa or less, more preferably 500 MPa or less, and even more preferably 450 MPa or less. If the flexural elastic modulus falls within the above range, the flight performance becomes excellent due to the optimized spin rate on long iron shots, and at the same time, the durability also becomes better.

The slab hardness of the (b-2) binary ionomer resin is preferably 50 or more, more preferably 55 or more, and even more preferably 60 or more, and is preferably 75 or less, more preferably 73 or less, and even more preferably 70 or less in Shore D hardness. If the slab hardness is 50 or more in Shore D hardness, the obtained constituent member has high hardness. In addition, if the slab hardness is 75 or less in Shore D hardness, the obtained constituent member does not become excessively hard and thus the golf ball has better durability.

The MFR (190° C., 2.16 kgf) of the (b-2) binary ionomer resin is preferably 0.1 g/10 min or more, more preferably 0.5 g/10 min or more, and even more preferably 1.0 g/10 min or more, and is preferably 30 g/10 min or less, more preferably 20 g/10 min or less, and even more preferably 15 g/10 min or less. If the MFR (190° C., 2.16 kgf) of the (b-2) binary ionomer resin is 0.1 g/10 min or more, the golf ball resin composition has better fluidity and thus, for example, a thin constituent member may be obtained. In addition, if the MFR (190° C., 2.16 kgf) of the (b-2) binary ionomer resin is 30 g/10 min or less, the obtained golf ball has better durability.

The flexural elastic modulus of the (b-4) ternary ionomer resin is preferably 10 MPa or more, more preferably 11 MPa or more, and even more preferably 12 MPa or more, and is preferably 100 MPa or less, more preferably 97 MPa or less, and even more preferably 95 MPa or less. If the flexural elastic modulus falls within the above range, the flight performance becomes excellent due to the optimized spin rate on long iron shots, and at the same time, the durability also becomes better.

The slab hardness of the (b-4) ternary ionomer resin is preferably 20 or more, more preferably 25 or more, and even more preferably 30 or more, and is preferably 70 or less, more preferably 65 or less, and even more preferably 60 or less in Shore D hardness. If the slab hardness is 20 or more in Shore D hardness, the obtained constituent member does not become excessively soft and thus the golf ball has better resilience. In addition, if the slab hardness is 70 or less in Shore D hardness, the obtained constituent member does not become excessively hard and thus the golf ball has better durability.

The MFR (190° C., 2.16 kgf) of the (b-4) ternary ionomer resin is preferably 0.1 g/10 min or more, more preferably 0.3 g/10 min or more, and even more preferably 0.5 g/10 min or more, and is preferably 20 g/10 min or less, more preferably 15 g/10 min or less, and even more preferably 10 g/10 min or less. If the MFR (190° C., 2.16 kgf) of the (b-4) ternary ionomer resin is 0.1 g/10 min or more, the golf ball resin composition has better fluidity and thus a thin constituent member may be formed. In addition, if the MFR (190° C., 2.16 kgf) of the (b-4) ternary ionomer resin is 20 g/10 min or less, the obtained golf ball has better durability.

The olefin constituting the (b-1), (b-2), (b-3) and (b-4) components is preferably an olefin having 2 to 8 carbon atoms, and examples thereof include ethylene, propylene, butene, pentene, hexene, heptene, and octene. In particular, ethylene is preferred.

Examples of the $\alpha,\beta$-unsaturated carboxylic acid having 3 to 8 carbon atoms constituting the (b-1), (b-2), (b-3) and (b-4) components include acrylic acid, methacrylic acid, fumaric acid, maleic acid and crotonic acid. In particular, acrylic acid and methacrylic acid are preferred.

Examples of the $\alpha,\beta$-unsaturated carboxylic acid ester constituting the (b-3) and (b-4) components include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferred.

As the (b-1) binary copolymer, a binary copolymer composed of ethylene and (meth)acrylic acid is preferred. As the (b-2) binary ionomer resin, a metal ion-neutralized product of an ethylene-(meth)acrylic acid binary copolymer is preferred. As the (b-3) ternary copolymer, a ternary copolymer composed of ethylene, (meth)acrylic acid and (meth)acrylic acid ester is preferred. As the (b-4) ternary ionomer resin, a metal ion-neutralized product of a ternary copolymer composed of ethylene, (meth)acrylic acid and (meth)acrylic acid ester is preferred. Herein, (meth)acrylic acid means acrylic acid and/or methacrylic acid.

Examples of the (b-1) binary copolymer include NUCREL (registered trademark) N1050H, N2050H, AN4318, N1110H and NO200H (manufactured by Du Pont-Mitsui Polychemicals Co. Ltd.); and PRIMACOR (registered trademark) 59801 (manufactured by Dow Chemical Company). Examples of the (b-3) ternary copolymer include NUCREL AN4318 and AN4319 (manufactured by Du Pont-Mitsui Polychemicals Co. Ltd.); NUCREL AE (manufactured by E.I. du Pont de Nemours and Company); and PRIMACOR (registered trademark) AT310 and AT320 (manufactured by Dow Chemical Company).

Examples of the (b-2) binary ionomer resin include Himilan (registered trademark) 1555 (Na), 1557 (Zn), 1605 (Na), 1706 (Zn), 1707 (Na), AM7311 (Mg), AM7329 (Zn) and AM7337 (Na) (manufactured by Du Pont-Mitsui Polychemicals Co. Ltd.); Surlyn (registered trademark) 8945 (Na), 9945 (Zn), 8140 (Na), 8150 (Na), 9120 (Zn), 9150 (Zn), 6910 (Mg), 6120 (Mg), 7930 (Li), 7940 (Li) and AD8546 (Li) (manufactured by E.I. du Pont de Nemours and Company); and Iotek (registered trademark) 8000 (Na), 8030 (Na), 7010 (Zn) and 7030 (Zn) (manufactured by ExxonMobil Chemical Corporation). It is noted that Na, Zn, Li, Mg or the like described in the parentheses after the trade name indicates a metal type of the neutralizing metal ion of the ionomer resin.

Examples of the (b-4) ternary ionomer resin include Himilan AM7327 (Zn), 1855 (Zn), 1856 (Na) and AM7331 (Na) (manufactured by Du Pont-Mitsui Polychemicals Co. Ltd.); Surlyn 6320 (Mg), 8120 (Na), 8320 (Na), 9320 (Zn), 9320W (Zn), HPF1000 (Mg) and HPF2000 (Mg) (manufactured by E.I. du Pont de Nemours and Company); and Iotek 7510 (Zn) and 7520 (Zn) (manufactured by ExxonMobil Chemical Corporation).

In the golf ball resin composition, the (B) component preferably includes the (b-2) binary ionomer resin and/or the (b-4) ternary ionomer resin, and more preferably includes the (b-2) binary ionomer resin. As the (b-2) binary ionomer resin, a mixture of a sodium-neutralized binary ionomer resin and a zinc-neutralized binary ionomer resin is preferably used. If the mixture is used, a better balance between the resilience and the durability may be easily struck.

The content of the (B) component in the resin component of the golf ball resin composition is preferably 5 mass % or more, more preferably 6 mass % or more, and even more preferably 7 mass % or more, and is preferably 80 mass % or less, more preferably 75 mass % or less, and even more preferably 70 mass % or less. If the content of the (B) component is 5 mass % or more, the resin composition has better resilience performance, and if the content of the (B) component is 80 mass % or less, the contents of the (A) component and the (C) component are relatively high and thus the effect of adding these components is enhanced.

The mass ratio ((A)/(B)) of the (A) component to the (B) component is preferably 0.05 or more, more preferably 0.11 or more, and even more preferably 0.18 or more, and is preferably 9.0 or less, more preferably 5.7 or less, and even more preferably 4.0 or less. If the mass ratio of the (A) component to the (B) component falls within the above range, the spin rate on long iron shots is lowered due to high flexural elastic modulus, the flight distance on long iron shots is increased due to better resilience, and the durability of the golf ball also becomes better.

[(C) Component]

The (C) component is a thermoplastic elastomer different from the (A) polyamide resin, and the (b-1) binary copolymer, the (b-2) binary ionomer resin, the (b-3) ternary copolymer and the (b-4) ternary ionomer resin which are the (B) component.

The flexural elastic modulus (ISO178) of the (C) thermoplastic elastomer is preferably 1 MPa or more, more preferably 2 MPa or more, and even more preferably 3 MPa or more, and is preferably 160 MPa or less, more preferably 140 MPa or less, and even more preferably 120 MPa or less. If the flexural elastic modulus falls within the above range, the golf ball has soft shot feeling while maintaining the rigidity of the layer formed from the resin composition.

The slab hardness of the (C) thermoplastic elastomer is preferably 3 or more, more preferably 4 or more, and even more preferably 5 or more, and is preferably 50 or less, more preferably 46 or less, even more preferably 42 or less, particularly preferably 30 or less, and most preferably 20 or less in Shore D hardness. If the slab hardness falls within the above range, the hardness of the resin composition may be easily adjusted.

Examples of the (C) thermoplastic elastomer include a thermoplastic styrene elastomer, a thermoplastic polyurethane elastomer, a thermoplastic polyester elastomer, and a thermoplastic polyolefin elastomer. Among them, the thermoplastic styrene elastomer and the thermoplastic polyester elastomer are preferred.

As the thermoplastic styrene elastomer, a thermoplastic elastomer containing a styrene block can be preferably used. The thermoplastic elastomer containing a styrene block has a polystyrene block which is a hard segment, and a soft segment. Typical soft segment is a diene block. Examples of the constituent component of the diene block include butadiene, isoprene, 1,3-pentadiene and 2,3-dimethyl-1,3-butadiene. Butadiene and isoprene are preferred. Two or more constituent components may be used in combination.

Examples of the thermoplastic elastomer containing a styrene block include a styrene-butadiene-styrene block copolymer (SBS), a styrene-isoprene-styrene block copolymer (SIS), a styrene-isoprene-butadiene-styrene block copolymer (SIBS), a hydrogenated product of SBS, a hydrogenated product of SIS and a hydrogenated product of SIBS. Examples of the hydrogenated product of SBS include a styrene-ethylene-butylene-styrene block copolymer (SEBS). Examples of the hydrogenated product of SIS include a styrene-ethylene-propylene-styrene block copolymer (SEPS). Examples of the hydrogenated product of SIBS include a styrene-ethylene-ethylene-propylene-styrene block copolymer (SEEPS).

The content of the styrene component in the thermoplastic elastomer containing a styrene block is preferably 10 mass % or more, more preferably 12 mass % or more, and particularly preferably 15 mass % or more. In light of the shot feeling of the obtained golf ball, the content is preferably 50 mass % or less, more preferably 47 mass % or less, and particularly preferably 45 mass % or less.

The thermoplastic elastomer containing a styrene block includes an alloy of one kind or two or more kinds selected from the group consisting of SBS, SIS, SIBS, SEBS, SEPS, SEEPS and hydrogenated products thereof with a polyolefin. It is estimated that the olefin component in the alloy contributes to the improvement of compatibility with the (B) component. By using the alloy, the resilience performance of the golf ball is increased. An olefin having 2 to 10 carbon atoms is preferably used. Appropriate examples of the olefin include ethylene, propylene, butane and pentene. Ethylene and propylene are particularly preferred.

Specific examples of the polymer alloy include Rabalon (registered trademark) T3221C, T3339C, SJ4400N, SJ5400N, SJ6400N, SJ7400N, SJ8400N, SJ9400N and SR04 (manufactured by Mitsubishi Chemical Corporation). Other specific examples of the thermoplastic elastomer containing a styrene block include Epofriend (registered trademark) A1010 (manufactured by Daicel Chemical Industries, Ltd.) and Septon (registered trademark) HG-252 (manufactured by Kuraray Co., Ltd.).

Examples of the thermoplastic polyurethane elastomer include a thermoplastic elastomer having a plurality of urethane bonds in the main molecular chain thereof. The polyurethane is preferably a product obtained by a reaction between a polyisocyanate component and a polyol component. Examples of the thermoplastic polyurethane elastomer include Elastollan (registered trademark) XNY85A, XNY90A, XNY97A, ET885 and ET890 (manufactured by BASF Japan Ltd.).

Examples of the thermoplastic polyester elastomer include a block copolymer having a hard segment formed from a polyester component, and a soft segment. Examples of the polyester component constituting the hard segment include an aromatic polyester. Examples of the component constituting the soft segment include an aliphatic polyether and an aliphatic polyester. Specific examples of the polyester elastomer include Hytrel (registered trademark) 3548 and 4047 (manufactured by Toray-Du Pont Co., Ltd.); and Primalloy (registered trademark) A1400, A1606, B1600 and B1700 (manufactured by Mitsubishi Chemical Corporation).

The content of the (C) component in the resin component of the golf ball resin composition is preferably 10 mass % or more, more preferably 15 mass % or more, and even more preferably 20 mass % or more, and is preferably 50 mass % or less, more preferably 45 mass % or less, and even more preferably 40 mass % or less. If the content of the (C) component is 10 mass % or more, the hardness of the resin composition is easily adjusted, and if the content of the (C) component is 50 mass % or less, the layer formed from the resin composition has better durability.

The mass ratio ((A)/(C)) of the (A) component to the (C) component is preferably 0.11 or more, more preferably 0.18 or more, and even more preferably 0.25 or more, and is preferably 1.5 or less, more preferably 1.2 or less, and even more preferably 1.0 or less. If the mass ratio of the (A) component to the (C) component falls within the above range, the layer formed from the resin composition has better durability.

The hardness difference (hardness of (A) component−hardness of (C) component) between the slab hardness of the (A) component and the slab hardness of the (C) component is preferably 10 or more, more preferably 15 or more, and even more preferably 20 or more, and is preferably 80 or less, more preferably 75 or less, and even more preferably 70 or less in Shore D hardness. If the hardness difference is 10 or more, the hardness of the resin composition is easily adjusted, and if the hardness difference is 80 or less, the layer formed from the resin composition has better impact resistance.

The flexural elastic modulus difference (flexural elastic modulus of (A) component−flexural elastic modulus of (C) component) between the flexural elastic modulus of the (A) component and the flexural elastic modulus of the (C) component is preferably 350 MPa or more, more preferably 400 MPa or more, and even more preferably 450 MPa or more, and is preferably 3,800 MPa or less, more preferably 3,600 MPa or less, and even more preferably 3,400 MPa or less. If the flexural elastic modulus difference is 350 MPa or more, the elastic modulus of the resin composition is easily adjusted, and if the flexural elastic modulus difference is 3,800 MPa or less, the layer formed from the resin composition has better impact resistance.

When the total amount of the (A) component, the (B) component and the (C) component is set as 100, the mass ratio ((A):(B):(C)) of these components is preferably 10 to 60:5 to 80:10 to 50, and more preferably 15 to 55:10 to 75:15 to 45. If the mass ratio falls within the above range, a better balance between the shot feeling and the durability of the golf ball obtained by using the resin composition may be struck.

The golf ball resin composition may further contain a resin component other than the (A) component, the (B) component and the (C) component as a resin component. In this case, the total content of the (A) component, the (B) component and the (C) component in the resin component of the golf ball resin composition is preferably 50 mass % or more, more preferably 60 mass % or more, and even more preferably 70 mass % or more. In addition, it is also preferred that the resin component consists of the (A) component, the (B) component and the (C) component.

The golf ball resin composition may further contain additives, for example, a pigment component such as a white pigment (e.g. titanium oxide) and a blue pigment, weight adjusting agent, dispersant, antioxidant, ultraviolet absorber, light stabilizer, fluorescent material or fluorescent brightener, and the like. Examples of the weight adjusting agent include an inorganic filler such as zinc oxide, barium sulfate, calcium carbonate, magnesium oxide, tungsten powder, and molybdenum powder.

[Physical Properties]

The ratio (flexural elastic modulus/slab hardness) of the flexural elastic modulus (MPa) to the slab hardness (Shore D hardness) of the golf ball resin composition of the present invention is 3 or more, preferably 3.3 or more, and more preferably 3.5 or more, and is 5 or less, preferably 4.7 or less, and more preferably 4.5 or less. If the ratio is 3 or more, the layer formed from the resin composition has high rigidity and thus the effect of low spin rate of the golf ball is enhanced, and if the ratio is 5 or less, the layer formed from the resin composition does not become excessively hard and thus the shot feeling of the golf ball becomes better.

The slab hardness of the golf ball resin composition is preferably 45 or more, more preferably 48 or more, and even more preferably 50 or more, and is preferably 65 or less, more preferably 62 or less, and even more preferably 60 or less in Shore D hardness. If the slab hardness falls within the above range, the flight distance on long iron shots is increased, and at the same time, the shot feeling of the golf ball is enhanced.

The flexural elastic modulus (ISO178) of the golf ball resin composition is preferably 130 MPa or more, more preferably 140 MPa or more, and even more preferably 150 MPa or more, and is preferably 400 MPa or less, more preferably 370 MPa or less, and even more preferably 300 MPa or less. If the flexural elastic modulus is 130 MPa or more, the layer formed from the resin composition has high elasticity, and the spin rate on long iron shots may be suppressed, thus the flight performance becomes better. If the flexural elastic modulus is 400 MPa or less, the layer formed from the resin composition does not become excessively hard and thus the golf ball has better shot feeling.

For the golf ball resin composition, the ratio (slab hardness×flexural elastic modulus/content of (A) component) of a product obtained by multiplying the slab hardness (Shore D hardness) by the flexural elastic modulus (MPa) to the content (mass %) of the (A) component in the resin component is preferably 100 or more, more preferably 140 or more, and even more preferably 180 or more, and is preferably 1050 or less, more preferably 1030 or less, and even more preferably 1000 or less. If the ratio (slab hardness×flexural elastic modulus/content of (A) component) is 100 or more, the amount of the (A) component does not become excessively high and thus the layer formed from the resin composition has better durability, and if the ratio (slab hardness×flexural elastic modulus/content of (A) component) is 1050 or less, the amount of the (A) component does not become excessively low and the layer formed from the resin composition has high hardness and high rigidity, thus the effect of low spin rate of the golf ball is enhanced, and the flight distance performance becomes better.

The flexural elastic modulus and the slab hardness of the golf ball resin composition can be adjusted by appropriately selecting the type, the amount or the like of the (A) component, the (B) component and the (C) component.

The golf ball resin composition of the present invention can be obtained, for example, by dry blending the (A) component, the (B) component and the (C) component. In addition, the dry blended mixture may be extruded into a pellet form. The dry blending is preferably carried out using, for example, a mixer capable of blending raw materials in a pellet form, more preferably carried out using a tumbler type mixer. The extruding can be carried out using a publicly known extruder such as a single-screw extruder, twin-screw extruder, and twin-single screw extruder.

[Golf Ball]

The golf ball of the present invention comprises a core, at least one intermediate layer covering the core, and a cover covering the intermediate layer, wherein at least one member of the core, at least one intermediate layer and the cover is formed from the above golf ball resin composition.

The construction of the golf ball is not particularly limited, and examples thereof include a multi-piece golf ball (three-piece golf ball, four-piece golf ball, five-piece golf ball, and the like) comprising a core, at least one intermediate layer covering the core, and a cover covering the intermediate layer. As the construction of the golf ball, a three-piece golf ball comprising a core, one intermediate layer covering the core, and a cover covering the intermediate layer, and a four-piece golf ball comprising a core, two intermediate layers covering the core, and a cover covering the intermediate layers are preferred.

The constituent member formed from the above golf ball resin composition may be the core, the intermediate layer or the cover, and is preferably the intermediate layer. The constituent member of the golf ball other than the constituent member formed from the above golf ball resin composition can employ conventionally known materials.

The core may employ a conventionally known rubber composition (hereinafter, sometimes simply referred to as "core rubber composition"), and can be formed, for example, by heat-pressing a rubber composition containing a base rubber, a co-crosslinking agent, and a crosslinking initiator.

As the base rubber, particularly preferred is a high cis-polybutadiene having cis-bond in a proportion of 40 mass % or more, preferably 70 mass % or more, and more preferably 90 mass % or more in view of its superior resilience property. The co-crosslinking agent is preferably an α,β-unsaturated carboxylic acid having 3 to 8 carbon atoms or a metal salt thereof, and more preferably a metal salt of acrylic acid or a metal salt of methacrylic acid. The metal constituting the metal salt is preferably zinc, magnesium, calcium, aluminum or sodium, more preferably zinc. The amount of the co-crosslinking agent is preferably 20 parts by mass or more and 50 parts by mass or less with respect to 100 parts by mass of the base rubber. When the α,β-unsaturated carboxylic acid having 3 to 8 carbon atoms is used as the co-crosslinking agent, a metal compound (e.g. magnesium oxide) is preferably used in combination. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator is preferably 0.2 part by mass or more, more preferably 0.3 part by mass or more, and is preferably 5 parts by mass or less, more preferably 3 parts by mass or less, with respect to 100 parts by mass of the base rubber.

In addition, the core rubber composition may further contain an organic sulfur compound. As the organic sulfur compound, diphenyldisulfides, thiophenols and thionaphthols are preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof are preferred. As the carboxylic acid, an aliphatic carboxylic acid or an aromatic carboxylic acid (e.g. benzoic acid) can be used. The amount of the carboxylic acid and/or the salt thereof is 1 part by mass or more and 40 parts by mass or less with respect to 100 parts by mass of the base rubber.

The core rubber composition may appropriately further contain a weight adjusting agent such as zinc oxide and barium sulfate, an antioxidant, a color powder or the like, in addition to the base rubber, the co-crosslinking agent, the crosslinking initiator, and the organic sulfur compound. The molding conditions for heat-pressing the core rubber composition should be determined appropriately depending on the formulation of the rubber composition. Generally, it is preferred that the molding is carried out by heating the core rubber composition at 130° C. to 200° C. for 10 minutes to 60 minutes, alternatively, by molding the core rubber composition in a two-step heating, i.e. at 130° C. to 150° C. for 20 minutes to 40 minutes, and then at 160° C. to 180° C. for 5 minutes to 15 minutes.

Examples of the intermediate layer material include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing at least a part of carboxyl groups in a copolymer composed of ethylene and an α,β-unsaturated carboxylic acid with a metal ion; and a product obtained by neutralizing at least a part of carboxyl groups in a terpolymer composed of ethylene, an α,β-unsaturated carboxylic acid and an α,β-unsaturated carboxylic acid ester with a metal ion. The intermediate layer may further contain a weight adjusting agent such as barium sulfate and tungsten, an antioxidant, and a pigment.

The method for forming the intermediate layer is not particularly limited, and examples thereof include a method of molding the intermediate layer composition into half shells beforehand, covering the spherical body with two of the half shells, and conducting compression molding; and a method of injection molding the intermediate layer composition directly onto the spherical body to cover the spherical body.

In case of injection molding the intermediate layer composition onto the spherical body to mold the intermediate layer, upper and lower molds for molding having a semispherical cavity are preferably used. When molding the intermediate layer by the injection molding method, the intermediate layer can be molded by protruding the hold pin to hold the spherical body to be covered, charging the heated and melt intermediate layer composition and then cooling the intermediate layer composition.

When molding the intermediate layer by the compression molding method, the half shell can be molded by either the compression molding method or the injection molding method, but the compression molding method is preferred. Compression molding the intermediate composition into the half shell can be carried out, for example, under a pressure of 1 MPa or more and 20 MPa or less at a molding temperature of −20° C. or more and 70° C. or less relative to the flow beginning temperature of the intermediate composition. By carrying out the molding under the above conditions, the half shell with a uniform thickness can be formed. Examples of the method for molding the intermediate layer with half shells include a method of covering the spherical body with two of the half shells and then conducting compression molding. Compression molding the half shells into the intermediate layer can be carried out, for example, under a molding pressure of 0.5 MPa or more and 25 MPa or less at a molding temperature of −20° C. or more and 70° C. or less relative to the flow beginning temperature of the intermediate composition. By carrying out the molding under the above conditions, the intermediate layer with a uniform thickness can be formed.

It is noted that the molding temperature means the highest temperature where the temperature at the surface of the concave portion of the lower mold reaches from closing the mold to opening the mold. In addition, the flow beginning temperature of the composition can be measured with "Flow Tester CFT-500" manufactured by Shimadzu Corporation by using the thermoplastic resin composition in a pellet form, under the conditions of plunger area: 1 cm$^2$, die length: 1 mm, die diameter: 1 mm, load: 588.399 N, start temperature: 30° C., and temperature increase rate: 3° C./min.

The thickness of the intermediate layer is preferably 0.3 mm or more, more preferably 0.4 mm or more, and even more preferably 0.5 mm or more, and is preferably 2.5 mm or less, more preferably 2.4 mm or less, and even more preferably 2.3 mm or less. In case of a plurality of intermediate layers, the total thickness of a plurality of intermediate layers preferably falls within the above range.

The cover material is not particularly limited, and examples thereof include an ionomer resin, a polyurethane, a polyamide, a polyester, and a polystyrene. Among them, the polyurethane and the ionomer resin are preferred.

Specific examples of the cover material include an ionomer resin having a trade name of "Himilan (registered trademark)" commercially available from Du Pont-Mitsui Polychemicals Co., Ltd., a thermoplastic polyurethane elastomer having a trade name of "Elastollan (registered trademark)" commercially available from BASF Japan Ltd., a thermoplastic polyamide elastomer having a trade name of "Pebax (registered trademark)" commercially available from Arkema Inc., a thermoplastic polyester elastomer having a trade name of "Hytrel (registered trademark)" commercially available from Du Pont-Toray Co., Ltd., a thermoplastic styrene elastomer having a trade name of "Rabalon (registered trademark)" or a thermoplastic polyester elastomer having a trade name of "Primalloy (registered trademark)" commercially available from Mitsubishi Chemical Corporation, and the like. These cover materials may be used solely or as a mixture of at least two of them.

In addition to the aforementioned resin component, the cover may further contain a pigment component such as a white pigment (e.g. titanium oxide), a blue pigment and a red pigment; a weight adjusting agent such as calcium carbonate and barium sulfate; a dispersant; an antioxidant; an ultraviolet absorber; a light stabilizer; a fluorescent material or fluorescent brightener; and the like, as long as they do not impair the performance of the cover.

The embodiment of molding the cover composition into the cover is not particularly limited, and examples thereof include an embodiment of injection molding the cover composition directly onto the core; and an embodiment of molding the cover composition into hollow shells, covering the core with a plurality of the shells and conducting compression molding (preferably an embodiment of molding the cover composition into hollow half-shells, covering the core with two of the half-shells and conducting compression molding). The golf ball body having the cover formed thereon is ejected from the mold, and preferably subjected to surface treatments such as deburring, cleaning and sandblast as necessary. Further, if desired, a mark may be formed thereon.

The thickness of the cover is preferably 4.0 mm or less, more preferably 3.0 mm or less, and even more preferably 2.0 mm or less. If the thickness of the cover is 4.0 mm or less, the obtained golf ball has better resilience and shot feeling. The thickness of the cover is preferably 0.3 mm or more, more preferably 0.5 mm or more, even more preferably 0.8 mm or more, and particularly preferably 1.0 mm or more. If the thickness of the cover is less than 0.3 mm, the durability and the abrasion resistance of the cover may deteriorate.

The total number of dimples formed on the cover is preferably 200 or more and 500 or less. If the total number of dimples is less than 200, the dimple effect is hardly obtained. On the other hand, if the total number of dimples exceeds 500, the dimple effect is hardly obtained because the size of the respective dimples is small. The dimple shape (shape in a plan view) includes, for example, without particular limitation, a circle; a polygonal shape such as a roughly triangular shape, a roughly quadrangular shape, a roughly pentagonal shape, and a roughly hexagonal shape; and another irregular shape. The dimple shape may be employed solely, or at least two of the shapes may be used in combination.

The golf ball having the cover formed thereon is ejected from the mold, and preferably subjected to surface treatments such as deburring, cleaning and sandblast as necessary. Further, if desired, a paint film or a mark may be formed thereon. The thickness of the paint film is not particularly limited, and is preferably 5 μm or more, more preferably 7 μm or more, and is preferably 50 μm or less, more preferably 40 μm or less, and even more preferably 30 μm or less. If the thickness of the paint film is less than 5 μm, the paint film is easily wear off due to continued use of the golf ball, and if the thickness of the paint film exceeds 50 μm, the dimple effect is reduced and thus the flight performance of the golf ball may deteriorate.

The golf ball of the present invention preferably has a diameter in a range from 40 mm to 45 mm. In light of satisfying a regulation of US Golf Association (USGA), the diameter is particularly preferably 42.67 mm or more. In light of prevention of the air resistance, the diameter is more preferably 44 mm or less, and particularly preferably 42.80 mm or less. In addition, the golf ball preferably has a mass of 40 g or more and 50 g or less. In light of obtaining greater inertia, the mass is more preferably 44 g or more, and particularly preferably 45 g or more. In light of satisfying a regulation of USGA, the mass is particularly preferably 45.93 g or less.

When the golf ball of the present invention has a diameter in a range from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.4 mm or more, even more preferably 2.5 mm or more, and most preferably 2.8 mm or more, and is preferably 5.0 mm or less, more preferably 4.5 mm or less. If the compression deformation amount is 2.0 mm or more, the golf ball does not become excessively hard, and thus the shot feeling thereof is better. On the other hand, if the compression deformation amount is 5.0 mm or less, the resilience is enhanced.

FIG. 1 is a partially cutaway sectional view showing a golf ball 1 of one embodiment according to the present invention. The golf ball 1 comprises a spherical core 2, an intermediate layer 3 disposed outside the spherical core 2, and a cover 4 disposed outside the intermediate layer 3. A plurality of dimples 41 are formed on the surface of the cover 4. Other portions than the dimples 41 on the surface of the cover 4 are land 42. In addition, the intermediate layer 3 is formed from the above golf ball resin composition.

In this embodiment, the thickness of the intermediate layer formed from the above golf ball resin composition is preferably 0.5 mm or more, more preferably 0.6 mm or more, and even more preferably 0.8 mm or more, and is preferably 3.0 mm or less, more preferably 2.8 mm or less, and even more preferably 2.6 mm or less. If the thickness of the intermediate layer is 0.5 mm or more, the intermediate layer has better durability, and if the thickness of the intermediate layer is 3.0 mm or less, the golf ball has better resilience performance.

Further, in this embodiment, the hardness difference (cover resin composition−intermediate layer resin composition) between the slab hardness of the cover resin composition and the slab hardness of the golf ball resin composition for forming the intermediate layer is preferably 0 or more, more preferably 2 or more, and even more preferably 4 or more, and is preferably 15 or less, more preferably 13 or less, and even more preferably 10 or less in Shore D hardness. If the hardness difference is 0 or more, the total golf ball has an outer-hard and inner-soft structure and thus the spin rate on long iron shots thereof is suppressed, and if the hardness difference is 15 or less, the difference between the deformation amount of the intermediate layer and the deformation amount of the cover at hitting does not become excessively high and thus the golf ball has better durability.

The slab hardness of the cover resin composition is preferably 50 or more, more preferably 53 or more, and even more preferably 55 or more, and is preferably 70 or less, more preferably 65 or less, and even more preferably 60 or less in Shore D hardness. If the slab hardness is 50 or more, the spin rate on long iron shots is suppressed and thus the flight performance becomes better, and if the slab hardness is 70 or less, the golf ball has better shot feeling.

The flexural elastic modulus (ISO178) of the cover resin composition is preferably 120 MPa or more, more preferably 135 MPa or more, and even more preferably 150 MPa or more, and is preferably 450 MPa or less, more preferably 430 MPa or less, and even more preferably 400 MPa or less. If the flexural elastic modulus is 120 MPa or more, the spin rate on long iron shots is suppressed and thus the flight performance becomes better, and if the flexural elastic modulus is 450 MPa or less, the golf ball has better shot feeling.

Examples

Hereinafter, the present invention will be described in detail by way of examples. However, the present invention is not limited to the examples described below, and various changes and modifications can be made without departing from the spirit and scope of the present invention.

[Evaluation Method]

(1) Slab Hardness (Shore D Hardness)

Sheets with a thickness of about 2 mm were produced by injection molding the resin composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester.

(2) Flexural Elastic Modulus (Three-Point Bending)

The flexural elastic modulus of the resin composition was measured according to ISO178 (2001). Specifically, a test piece having a length of 80.0±2 mm, a width of 10.0±0.2 mm and a thickness of 4.0±0.2 mm was produced by injection molding the resin composition, and immediately kept in a moisture-proof container at 23° C.±2° C. for at least 24 hours. After the test piece was taken from the moisture-proof container, the bending test was immediately conducted (within fifteen minutes) with a precision universal tester (Autograph (registered trademark) manufactured by Shimadzu Corporation). The measurement was carried out under the conditions of indenter radius: 5.0 mm, supporting member radius: 2 mm, distance between fulcrums: 64 mm, test speed: 2 mm/min, test temperature: 23° C., and humidity: 50% RH. The flexural elastic modulus was calculated according to the following formula.

Flexural elastic modulus=$(\sigma_{f2}-\sigma_{f1})/(0.0025-0.0005)$

[In the formula, $\sigma_{f1}$ represents a stress corresponding to a strain of 0.0005, and $\sigma_{f2}$ represents a stress corresponding to a strain of 0.0025.]

(3) Compression Deformation Amount (mm)

The compression deformation amount of the golf ball along the compression direction (shrinking amount of the golf ball along the compression direction) when applying a load from 98 N as an initial load to 1275 N as a final load to the golf ball was measured.

(4) Spin Rate (rpm) and Flight Distance (m)

A No. 5 iron (XXIO8 manufactured by Dunlop Sports Limited) was installed on a swing robot M/C manufactured by Golf Laboratories, Inc. The golf ball was hit at a head speed of 34 m/sec, and the spin rate and the flight distance (distance from the launch point to the stop point) were measured. The measurement was conducted twelve times for each golf ball, and the average value thereof was used as the measurement value for the golf ball. It is noted that a sequence of photographs of the hit golf ball were taken for measuring the spin rate right after hitting the golf ball.

(5) Shot Feeling

An actual hitting test was carried out by ten amateur golfers (high skilled persons) using a No. 5 iron (XXIO manufactured by Dunlop Sports Limited). The shot feeling was graded by each of the golfers, and the average value thereof was calculated. The best shot feeling was graded as 5.0, and the worst shot feeling was graded as 0.

[Preparation of Golf Ball Resin Composition]

The materials having a formulation shown in Tables 1, 2 were extruded with a twin-screw kneading extruder to prepare a golf ball resin composition in a pellet form. The extruding was conducted under the conditions of screw diameter: 45 mm, screw revolution: 200 rpm, and screw L/D: 35. The blended material was heated to 160° C. to 230° C. at the die position of the extruder.

TABLE 1

| | | | Golf ball resin composition No. | | | | | |
| --- | --- | --- | --- | --- | --- | --- | --- | --- |
| | | | 1 | 2 | 3 | 4 | 5 | 6 |
| Formulation (parts by mass) | (A) Component | Polyamide 6 | 10 | 20 | 40 | 40 | 40 | 40 |
| | (B) Component | Himilan AM7329 | 35 | 30 | 17.5 | 20 | 15 | 17.5 |
| | | Himilan AM7327 | — | — | — | — | — | 17.5 |
| | | Himilan AM7337 | 35 | 30 | 17.5 | 20 | 15 | — |
| | | NUCREL N1050H | — | — | — | — | — | — |
| | (C) Component | Rabalon T3221C | 20 | 20 | 25 | 20 | 30 | 25 |
| | | Primalloy A1400 | — | — | — | — | — | — |
| Physical properties | | Mass ratio (A)/(B) | 0.1 | 0.3 | 1.1 | 1.0 | 1.3 | 1.1 |
| | | Mass ratio (A)/(C) | 0.5 | 1.0 | 1.6 | 2.0 | 1.3 | 1.6 |
| | | Slab hardness (Shore D) | 56 | 57 | 57 | 59 | 55 | 56 |
| | | Flexural elastic modulus (MPa) | 180 | 190 | 200 | 210 | 185 | 190 |
| | | Flexural elastic modulus/slab hardness | 3.21 | 3.33 | 3.51 | 3.56 | 3.36 | 3.39 |
| | | (Slab hardness × flexural elastic modulus)/(A) content in resin component (%) | 1008 | 542 | 285 | 310 | 254 | 266 |

| | | | Golf ball resin composition No. | | | | | |
| --- | --- | --- | --- | --- | --- | --- | --- | --- |
| | | | 7 | 8 | 9 | 10 | 11 | 12 |
| Formulation (parts by mass) | (A) Component | Polyamide 6 | 40 | 60 | 40 | 40 | 40 | 40 |
| | (B) Component | Himilan AM7329 | 17.5 | 2.5 | 12.5 | 12.5 | 17.5 | 15 |
| | | Himilan AM7327 | 10 | — | — | — | — | — |
| | | Himilan AM7337 | 7.5 | 2.5 | 12.5 | 12.5 | 17.5 | 15 |
| | | NUCREL N1050H | — | — | — | 10 | — | — |
| | (C) Component | Rabalon T3221C | 25 | 35 | 35 | 25 | — | — |
| | | Primalloy A1400 | — | — | — | — | 25 | 30 |

TABLE 1-continued

| Physical properties | Mass ratio (A)/(B) | 1.1 | 12.0 | 1.6 | 1.1 | 1.1 | 1.3 |
|---|---|---|---|---|---|---|---|
| | Mass ratio (A)/(C) | 1.6 | 1.7 | 1.1 | 1.6 | 1.6 | 1.3 |
| | Slab hardness (Shore D) | 57 | 60 | 53 | 55 | 58 | 61 |
| | Flexural elastic modulus (MPa) | 195 | 230 | 170 | 180 | 210 | 235 |
| | Flexural elastic modulus/slab hardness | 3.42 | 3.83 | 3.21 | 3.27 | 3.62 | 3.85 |
| | (Slab hardness × flexural elastic modulus)/(A) content in resin component (%) | 278 | 230 | 225 | 248 | 305 | 358 |

TABLE 2

| | | | Golf ball resin composition No. | | | | | |
|---|---|---|---|---|---|---|---|---|
| | | | 13 | 14 | 15 | 16 | 17 | 18 |
| Formulation (parts by mass) | (A) Component | Polyamide 6 | 10 | 20 | 40 | 60 | — | — |
| | (B) Component | Himilan AM7329 | 45 | 40 | 30 | 20 | 40 | 40 |
| | | Himilan AM7327 | — | — | — | — | — | — |
| | | Himilan AM7337 | 45 | 40 | 30 | 20 | 51 | 45 |
| | | NUCREL N1050H | — | — | — | — | — | — |
| | (C) Component | Rabalon T3221C | — | — | — | — | 9 | 15 |
| | | Primalloy A1400 | — | — | — | — | — | — |
| Physical properties | | Mass ratio (A)/(B) | 0.1 | 0.3 | 0.7 | 1.5 | — | — |
| | | Mass ratio (A)/(C) | — | — | — | — | — | — |
| | | Slab hardness (Shore D) | 69 | 71 | 74 | 76 | 58 | 56 |
| | | Flexural elastic modulus (MPa) | 395 | 430 | 625 | 840 | 170 | 145 |
| | | Flexural elastic modulus/slab hardness | 5.72 | 6.06 | 8.45 | 11.05 | 2.93 | 2.59 |
| | | (Slab hardness × flexural elastic modulus)/(A) content in resin component (%) | 2726 | 1527 | 1156 | 1064 | — | — |

| | | | Golf ball resin composition No. | | | | | |
|---|---|---|---|---|---|---|---|---|
| | | | 19 | 20 | 21 | 22 | 23 | 24 |
| Formulation (parts by mass) | (A) Component | Polyamide 6 | — | — | — | — | 20 | 80 |
| | (B) Component | Himilan AM7329 | 40 | 50 | 40 | 40 | 10 | 2.5 |
| | | Himilan AM7327 | — | — | — | — | — | — |
| | | Himilan AM7337 | 40 | 24 | 30 | 26 | 10 | 2.5 |
| | | NUCREL N1050H | — | — | — | — | — | — |
| | (C) Component | Rabalon T3221C | 20 | 26 | 30 | 34 | 60 | 15 |
| | | Primalloy A1400 | — | — | — | — | — | — |
| Physical properties | | Mass ratio (A)/(B) | — | — | — | — | 1.0 | 16.0 |
| | | Mass ratio (A)/(C) | — | — | — | — | 0.3 | 5.3 |
| | | Slab hardness (Shore D) | 54 | 52 | 48 | 45 | 42 | 78 |
| | | Flexural elastic modulus (MPa) | 130 | 120 | 110 | 100 | 80 | 1100 |
| | | Flexural elastic modulus/slab hardness | 2.41 | 2.31 | 2.29 | 2.22 | 1.90 | 14.10 |
| | | (Slab hardness × flexural elastic modulus)/(A) content in resin component (%) | — | — | — | — | 168 | 1073 |

The detailed raw materials used in Tables 1, 2 are as follows.

Polyamide 6: Amilan (registered trademark) CM1017K (degree of crystallinity: 7%, relative viscosity: 2.65, MFR (260° C., 325 gf): 8.27 g/min, flexural elastic modulus: 3.1 GPa (23° C. absolute dry), Shore D hardness: 65 to 90) manufactured by Toray Industries, Inc.

Himilan AM7329: zinc ion-neutralized ethylene-methacrylic acid copolymer ionomer resin (MFR (190° C., 2.16 kgf): 5 g/10 min, flexural elastic modulus: 240 MPa, Shore D hardness: 62) manufactured by Du Pont-Mitsui Polychemicals Co. Ltd. Himilan AM7327: zinc ion-neutralized ethylene-methacrylic acid-butyl acrylate ternary copolymer ionomer resin (MFR (190° C., 2.16 kgf): 0.7 g/10 min, flexural elastic modulus: 35 MPa, Shore D hardness: 42) manufactured by Du Pont-Mitsui Polychemicals Co. Ltd.

Himilan AM7337: sodium ion-neutralized ethylene-methacrylic acid copolymer ionomer resin (MFR (190° C., 2.16 kgf): 5 g/10 min, flexural elastic modulus: 254 MPa, Shore D hardness: 64) manufactured by Du Pont-Mitsui Polychemicals Co. Ltd.

NUCREL N1050H: ethylene-methacrylic acid copolymer manufactured by Du Pont-Mitsui Polychemicals Co. Ltd.

Rabalon T3221C: thermoplastic styrene elastomer (an alloy of one kind or two or more kinds selected from the group consisting of SBS, SIS, SIBS, SEBS, SEPS, SEEPS and hydrogenated products thereof with a polyolefin) (flexural elastic modulus: 1 to 160 MPa, Shore D hardness: 3 to 50) manufactured by Mitsubishi Chemical Corporation Primalloy A1400: thermoplastic polyester elastomer (flexural elastic modulus: 1 to 160 MPa, Shore D hardness: 3 to 50) manufactured by Mitsubishi Chemical Corporation

[Production of Golf Ball]
(1) Production of Core

The rubber composition having a formulation shown in Table 3 was kneaded, and then heat-pressed in upper and lower molds having a semispherical cavity at 170° C. for 30 minutes to obtain a core.

TABLE 3

| | Core rubber composition | |
|---|---|---|
| Formulation (parts by mass) | Polybutadiene rubber | 100 |
| | Zinc acrylate | 26 |
| | Zinc oxide | 5 |
| | 2-Thionaphthol | 0.2 |
| | Dicumyl peroxide | 0.8 |
| | Barium sulfate | Appropriate amount |

Polybutadiene rubber: "BR-730 (high cis-polybutadiene)" manufactured by JSR Corporation
Zinc acrylate: "ZNDA-90S" manufactured by Nihon Jyoryu Kogyo Co., Ltd. Zinc oxide: "Ginrei (registered trademark) R" manufactured by Toho Zinc Co., Ltd. 2-Thionaphthol: manufactured by Tokyo Chemical Industry Co., Ltd.
Dicumyl peroxide: "Percumyl (registered trademark) D" manufactured by NOF Corporation
Barium sulfate: "Barium Sulfate BD" manufactured by Sakai Chemical Industry Co., Ltd.

(2) Production of Intermediate Layer

The golf ball resin composition was injection molded on the above-obtained core to form an intermediate layer (thickness: 1.0 mm).

(3) Molding of Cover

The materials having a formulation shown in Table 4 were mixed with a twin-screw kneading extruder to prepare a cover resin composition in a pellet form. The extruding was conducted under the conditions of screw diameter: 45 mm, screw revolution: 200 rpm, and screw L/D: 35. The blended material was heated to 160° C. to 230° C. at the die position of the extruder. The cover resin composition was injection molded onto the intermediate layer to form a cover. A mold provided with a plurality of pimples on the cavity surface thereof was used, and a plurality of dimples having a reversed shape of the pimple shape were formed on the cover.

TABLE 4

| | Cover resin composition | |
|---|---|---|
| Formulation (parts by mass) | Himilan AM7337 | 5 |
| | Himilan 1555 | 10 |
| | Himilan AM7329 | 55 |
| | NUCREL N1050H | 30 |
| | Titanium dioxide | 3 |
| Slab hardness (Shore D) | | 61 |
| Flexural elastic modulus (MPa) | | 195 |

Himilan AM7337: sodium ion-neutralized ethylene-methacrylic acid copolymer ionomer resin manufactured by Du Pont-Mitsui Polychemicals Co. Ltd.
Himilan 1555: sodium ion-neutralized ethylene-methacrylic acid copolymer ionomer resin manufactured by Du Pont-Mitsui Polychemicals Co. Ltd.
Himilan AM7329: zinc ion-neutralized ethylene-methacrylic acid copolymer ionomer resin manufactured by Du Pont-Mitsui Polychemicals Co. Ltd.
NUCREL N1050H: ethylene-methacrylic acid copolymer manufactured by Du Pont-Mitsui Polychemicals Co. Ltd.

The surface of the obtained golf ball body was treated with sandblast, marked, and painted with a clear paint. The paint was dried in an oven at 40° C. to obtain a golf ball. The evaluation results with respect to the obtained golf balls were shown in Tables 5 and 6.

TABLE 5

| | | | | Golf ball No. | | | | | |
|---|---|---|---|---|---|---|---|---|---|
| | | | | 1 | 2 | 3 | 4 | 5 | 6 |
| | | Core diameter (mm) | | 39.1 | 39.1 | 39.1 | 39.1 | 39.1 | 39.1 |
| Intermediate layer | Material property | Slab hardness (Shore D) | | 56 | 57 | 57 | 59 | 55 | 56 |
| | | Flexural elastic modulus (MPa) | | 180 | 190 | 200 | 210 | 185 | 190 |
| | | Flexural elastic modulus/slab hardness | | 3.21 | 3.33 | 3.51 | 3.56 | 3.36 | 3.39 |
| | | (Slab hardness × flexural elastic modulus)/(A) content in resin component (%) | | 1008 | 542 | 285 | 310 | 254 | 266 |
| | | Thickness (mm) | | 1.0 | 1.0 | 1.0 | 1.0 | 1.0 | 1.0 |
| Cover thickness (mm) | | | | 0.8 | 0.8 | 0.8 | 0.8 | 0.8 | 0.8 |
| Golf ball evaluation | | Compression deformation amount (mm) | | 3.26 | 3.22 | 3.22 | 3.19 | 3.28 | 3.27 |
| | On long iron shots | Spin rate (rpm) | | 4172 | 4162 | 4146 | 4126 | 4166 | 4156 |
| | | Flight distance (m) | | 145.0 | 145.1 | 145.2 | 145.4 | 145.1 | 145.2 |
| | | Shot feeling | | 3.9 | 3.8 | 3.7 | 3.5 | 4.0 | 3.8 |

| | | | | Golf ball No. | | | | | |
|---|---|---|---|---|---|---|---|---|---|
| | | | | 7 | 8 | 9 | 10 | 11 | 12 |
| | | Core diameter (mm) | | 39.1 | 39.1 | 39.1 | 39.1 | 39.1 | 39.1 |
| Intermediate layer | Material property | Slab hardness (Shore D) | | 57 | 60 | 53 | 55 | 58 | 61 |
| | | Flexural elastic modulus (MPa) | | 195 | 230 | 170 | 180 | 210 | 235 |
| | | Flexural elastic modulus/slab hardness | | 3.42 | 3.83 | 3.21 | 3.27 | 3.62 | 3.85 |
| | | (Slab hardness × flexural elastic modulus)/(A) content in resin component (%) | | 278 | 230 | 225 | 248 | 305 | 358 |

TABLE 5-continued

|  |  |  |  |  |  |  |  |
|---|---|---|---|---|---|---|---|
|  | Thickness (mm) | 1.0 | 1.0 | 1.0 | 1.0 | 1.0 | 1.0 |
|  | Cover thickness (mm) | 0.8 | 0.8 | 0.8 | 0.8 | 0.8 | 0.8 |
| Golf ball evaluation | Compression deformation amount (mm) | 3.20 | 3.12 | 3.31 | 3.26 | 3.20 | 3.10 |
| On long iron shots | Spin rate (rpm) | 4134 | 4086 | 4220 | 4186 | 4130 | 4060 |
|  | Flight distance (m) | 145.3 | 145.7 | 144.7 | 144.8 | 145.4 | 145.8 |
|  | Shot feeling | 3.6 | 3.3 | 4.0 | 3.9 | 3.6 | 3.6 |

TABLE 6

|  |  |  | Golf ball No. | | | | | |
|---|---|---|---|---|---|---|---|---|
|  |  |  | 13 | 14 | 15 | 16 | 17 | 18 |
| Intermediate layer | Material property | Core diameter (mm) | 39.1 | 39.1 | 39.1 | 39.1 | 39.1 | 39.1 |
|  |  | Slab hardness (Shore D) | 69 | 71 | 74 | 76 | 58 | 56 |
|  |  | Flexural elastic modulus (MPa) | 395 | 430 | 625 | 840 | 170 | 145 |
|  |  | Flexural elastic modulus/slab hardness | 5.72 | 6.06 | 8.45 | 11.05 | 2.93 | 2.59 |
|  |  | (Slab hardness × flexural elastic modulus)/(A) content in resin component (%) | 2726 | 1527 | 1156 | 1064 | — | — |
|  |  | Thickness (mm) | 1.0 | 1.0 | 1.0 | 1.0 | 1.0 | 1.0 |
|  |  | Cover thickness (mm) | 0.8 | 0.8 | 0.8 | 0.8 | 0.8 | 0.8 |
| Golf ball evaluation |  | Compression deformation amount (mm) | 2.91 | 2.86 | 2.79 | 2.72 | 3.20 | 3.23 |
|  | On long iron shots | Spin rate (rpm) | 4066 | 4050 | 4038 | 4020 | 4244 | 4280 |
|  |  | Flight distance (m) | 145.8 | 146.0 | 146.0 | 146.2 | 144.5 | 144.2 |
|  |  | Shot feeling | 1.8 | 1.4 | 1.2 | 1.1 | 3.4 | 3.6 |

|  |  |  | Golf ball No. | | | | | |
|---|---|---|---|---|---|---|---|---|
|  |  |  | 19 | 20 | 21 | 22 | 23 | 24 |
| Intermediate layer | Material property | Core diameter (mm) | 39.1 | 39.1 | 39.1 | 39.1 | 39.1 | 39.1 |
|  |  | Slab hardness (Shore D) | 54 | 52 | 48 | 45 | 42 | 78 |
|  |  | Flexural elastic modulus (MPa) | 130 | 120 | 110 | 100 | 80 | 1100 |
|  |  | Flexural elastic modulus/slab hardness | 2.41 | 2.31 | 2.29 | 2.22 | 1.90 | 14.10 |
|  |  | (Slab hardness × flexural elastic modulus)/(A) content in resin component (%) | — | — | — | — | 168 | 1073 |
|  |  | Thickness (mm) | 1.0 | 1.0 | 1.0 | 1.0 | 1.0 | 1.0 |
|  |  | Cover thickness (mm) | 0.8 | 0.8 | 0.8 | 0.8 | 0.8 | 0.8 |
| Golf ball evaluation |  | Compression deformation amount (mm) | 3.28 | 3.32 | 3.36 | 3.41 | 3.50 | 2.61 |
|  | On long iron shots | Spin rate (rpm) | 4306 | 4324 | 4352 | 4372 | 4406 | 3990 |
|  |  | Flight distance (m) | 144.0 | 143.9 | 143.7 | 143.5 | 143.2 | 146.4 |
|  |  | Shot feeling | 3.7 | 4.0 | 4.1 | 4.3 | 4.4 | 1.1 |

The golf balls No. 1 to No. 12 are the cases where the intermediate layer is formed from a resin composition containing the (A) component, the (B) component and the (C) component and having a ratio (flexural elastic modulus/slab hardness) of a flexural elastic modulus (MPa) to a slab hardness (Shore D hardness) in a range from 3 to 5. Any one of these golf balls shows low spin rate on long iron shots, excellent flight distance and excellent shot feeling.

The golf balls No. 13 to No. 16 are the cases where the intermediate layer is formed from a resin composition not containing the (C) component. In addition, the golf ball No. 24 is the case where the intermediate layer is formed from a resin composition having a ratio (flexural elastic modulus/slab hardness) of more than 5. Although the resin composition of these golf balls No. 13 to No. 16 and No. 24 has high flexural elastic modulus, the slab hardness thereof is also high, thus the obtained golf balls have inferior shot feeling. The golf balls No. 17 to No. 22 are the cases where the intermediate layer is formed from a resin composition not containing the (A) component. In addition, the golf ball No. 23 is the case where the intermediate layer is formed from a resin composition having a ratio (flexural elastic modulus/slab hardness) of less than 3. The resin composition of these golf balls No. 17 to No. 23 has low flexural elastic modulus, thus the obtained golf balls show high spin rate on long iron shots and inferior flight distance.

This application is based on Japanese patent application No. 2015-071843 filed on Mar. 31, 2015, the content of which is hereby incorporated by reference.

The invention claimed is:

1. A golf ball resin composition having a ratio (flexural elastic modulus/slab hardness) of a flexural elastic modulus (MPa) thereof to a slab hardness (Shore D hardness) thereof in a range from 3 to 5, and containing, as a resin component,
(A) a polyamide resin,
(B) at least one selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β- unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, and (C) a thermoplastic elastomer different from the (A) component and the (B) component, wherein the slab hardness of the golf ball resin composition is 61 or less in Shore D hardness.

2. The golf ball resin composition according to claim 1, wherein a ratio (slab hardness×flexural elastic modulus/content of (A) component) is 1050 or less, the ratio (slab hardness×flexural elastic modulus/content of (A) component) is obtained by dividing a product (slab hardness×flexural elastic modulus) by a content (mass %) of the (A) component in the resin component of the golf ball resin composition, and the product (slab hardness×flexural elastic modulus) is obtained by multiplying the slab hardness (Shore D hardness) by the flexural elastic modulus (MPa).

3. The golf ball resin composition according to claim 1, wherein the slab hardness of the golf ball resin composition ranges from 45 to 61 in Shore D hardness.

4. The golf ball resin composition according to claim 1, wherein the flexural elastic modulus of the golf ball resin composition ranges from 130 MPa to 400 MPa.

5. The golf ball resin composition according to claim 1, wherein a mass ratio ((A):(B):(C)) of the (A) component, the (B) component and the (C) component ranges from 10 to 60:5 to 80:5 to 50 (a total of the (A) component, the (B) component and the (C) component is 100).

6. The golf ball resin composition according to claim 1, wherein the (C) component contains a styrene-based thermoplastic elastomer.

7. The golf ball resin composition according to claim 1, wherein the flexural elastic modulus of the golf ball resin composition is 235 MPa or less.

8. The golf ball resin composition according to claim 1, wherein a flexural elastic modulus of the (C) thermoplastic elastomer ranges from 1 MPa to 160 MPa.

9. The golf ball resin composition according to claim 1, wherein a slab hardness of the (C) thermoplastic elastomer ranges from 3 to 50 in Shore D hardness.

10. A golf ball comprising
a core, at least one intermediate layer covering the core, and a cover covering the intermediate layer,
wherein at least one member of the core, at least one intermediate layer and the cover is formed from a golf ball resin composition having a ratio (flexural elastic modulus/slab hardness) of a flexural elastic modulus (MPa) thereof to a slab hardness (Shore D hardness) thereof in a range from 3 to 5, and containing, as a resin component,
(A) a polyamide resin,
(B) at least one selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, and (C) a thermoplastic elastomer different from the (A) component and the (B) component, wherein the slab hardness of the golf ball resin composition is 61 or less in Shore D hardness.

11. The golf ball according to claim 10, wherein a ratio (slab hardness×flexural elastic modulus/content of (A) component) is 1050 or less, the ratio (slab hardness×flexural elastic modulus/content of (A) component) is obtained by dividing a product (slab hardness×flexural elastic modulus) by a content (mass %) of the (A) component in the resin component of the golf ball resin composition, and the product (slab hardness×flexural elastic modulus) is obtained by multiplying the slab hardness (Shore D hardness) by the flexural elastic modulus (MPa).

12. The golf ball according to claim 10, wherein the slab hardness of the golf ball resin composition ranges from 45 to 61 in Shore D hardness.

13. The golf ball according to claim 10, wherein the flexural elastic modulus of the golf ball resin composition ranges from 130 MPa to 400 MPa.

14. The golf ball according to claim 10,
wherein a mass ratio ((A): (B): (C)) of the (A) component, the (B) component and the (C) component ranges from 10 to 60:5 to 80:5 to 50, and
wherein the (A) component, the (B) component and the (C) component total is set as 100.

15. The golf ball according to claim 10, wherein the (C) component contains a styrene-based thermoplastic elastomer.

16. The golf ball according to claim 10, wherein the intermediate layer is formed from the golf ball resin composition.

17. The golf ball according to claim 16, wherein the intermediate layer has a thickness in a range from 0.5 mm to 3.0 mm.

18. The golf ball according to claim 10, wherein the cover has a slab hardness in a range from 50 to 70 in Shore D hardness.

19. The golf ball according to claim 10, wherein the cover has a flexural elastic modulus in a range from 120 MPa to 450 MPa.

20. The golf ball according to claim 10, wherein the cover has a thickness in a range from 0.3 mm to 4.0 mm.

21. The golf ball according to claim 16, wherein a hardness difference (cover resin composition−intermediate layer resin composition) between a slab hardness of a cover resin composition for forming the cover and a slab hardness of an intermediate layer resin composition for forming the intermediate layer ranges from 0 to 15 in Shore D hardness.

22. The golf ball according to claim 10, wherein the ratio (flexural elastic modulus/slab hardness) ranges from 3 to 4.5.

23. The golf ball according to claim 11, wherein the ratio (slab hardness×flexural elastic modulus/content of (A) component) is 100 or more.

24. The golf ball according to claim 10, wherein the flexural elastic modulus of the golf ball resin composition is 235 MPa or less.

25. The golf ball according to claim 10, wherein a flexural elastic modulus of the (C) thermoplastic elastomer ranges from 1 MPa to 160 MPa.

26. The golf ball according to claim 10, wherein a slab hardness of the (C) thermoplastic elastomer ranges from 3 to 50 in Shore D hardness.

\* \* \* \* \*